UNITED STATES PATENT OFFICE.

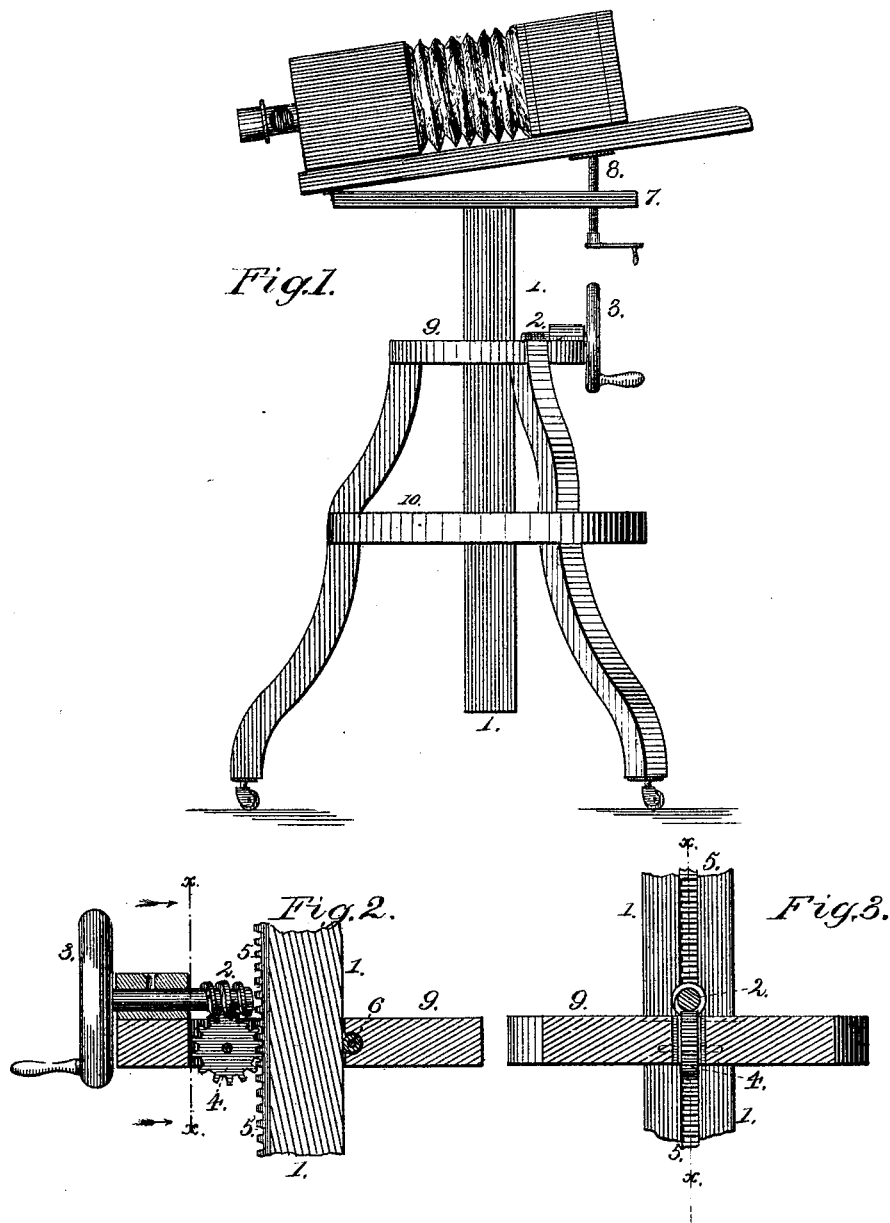

MATHIES STRIEGEL, OF TOLEDO, OHIO.

IMPROVEMENT IN PHOTOGRAPHIC-CAMERA STANDS.

Specification forming part of Letters Patent No. 180,806, dated August 8, 1876; application filed November 15, 1875.

*To all whom it may concern:*

Be it known that I, MATHIES STRIEGEL, of Toledo, in the county of Lucas and State of Ohio, have invented certain new and useful Improvements in Camera-Stands, of which the following is a specification:

My invention relates to a camera-stand which is adjustable to vary the height or inclination of the optic axis, as may be required.

The manner in which this adjustment is attained, and the subject-matter claimed, will hereinafter specifically be set forth.

In the accompanying drawings, Figure 1 is a side elevation of my device; Fig. 2, a detail sectional view of the elevating mechanism, taken on the line $x\,x$ of Fig. 3, and Fig. 3 a similar section thereof, taken on the line $x\,x$ of Fig. 2.

The camera-stand proper is mounted upon a vertical rack-bar or upright, 1, supported and capable of a free endwise movement in a suitable base or frame mounted upon casters, which frame is composed, in the present instance, of a proper number of legs connected together and braced by horizontal frame-pieces 9 10, which also serve as tables for the operator. This rack-bar or upright, the teeth of which may either be secured thereto or form part thereof, is raised or lowered, as occasion requires, for the proper vertical adjustment of the camera, by means of a worm-shaft, 2, mounted and turning in suitable bearings upon the base or frame, (located in the present instance upon the frame-piece 9,) which meshes with a pinion-wheel, 4, also mounted in suitable bearings in said frame-piece, which pinion in turn meshes with and, by its revolution imparted by the worm-shaft, raises or lowers the rack-bar or upright, and consequently the camera, accordingly as the worm-shaft, which has a proper crank-wheel or handle, 3, extending to within easy reach of the operator, is turned in one direction or the other.

To diminish excessive friction, and to secure an easy movement, I provide a small roller, 6, between the back of the upright and the frame-piece upon which the gearing is mounted.

To vary the angle of inclination of the camera-platform relatively to the top board 7, to which it is hinged at its front end, I provide a screw, 8, turning in bearings in said board near its rear end, the upper end of which screw works in a suitably-slotted plate on the under side of the platform, to compensate its movement.

By rotating the screw, which has a handle convenient to the operator, the angle of inclination of the camera may be varied to any degree desired.

From the foregoing description of my invention it will be perceived that adjustment of the camera, both vertically and as to inclination, is easily and conveniently accomplished by the operator, while allowing him to attend properly to his operations.

I claim as of my own invention—

1. The combination, substantially as hereinbefore set forth, of the base or frame, the rack-bar or upright carrying the camera-platform passing therethrough, the worm-wheel mounted on said frame, and a pinion-wheel intermediate between the rack-bar and worm-wheel, by the revolution of which the camera is raised or lowered.

2. The improved camera-stand hereinbefore described, consisting of the combination of the base or frame, the tables thereof, the pinion and worm wheel mounted thereon, the endwise-moving rack-bar, and the screw working in a suitably-slotted plate of the platform, to vary its inclination, these members being constructed to operate, as and for the purposes set forth.

MATHIES STRIEGEL.

Witnesses:
   C. WEBER,
   JOHN KOELLA.